L. S. LACHMAN.
METHOD OF ELECTRIC WELDING.
APPLICATION FILED OCT. 17, 1906.
979,970.
Patented Dec. 27, 1910.
2 SHEETS—SHEET 1.
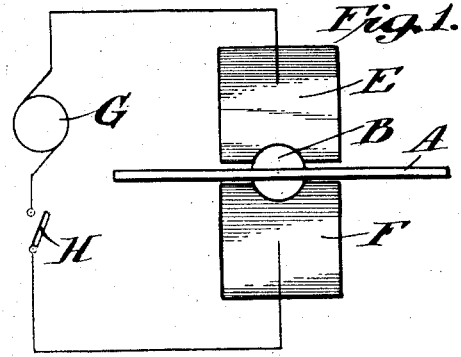
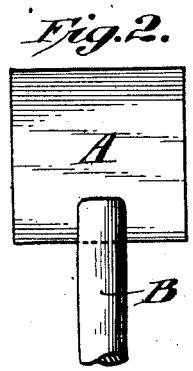
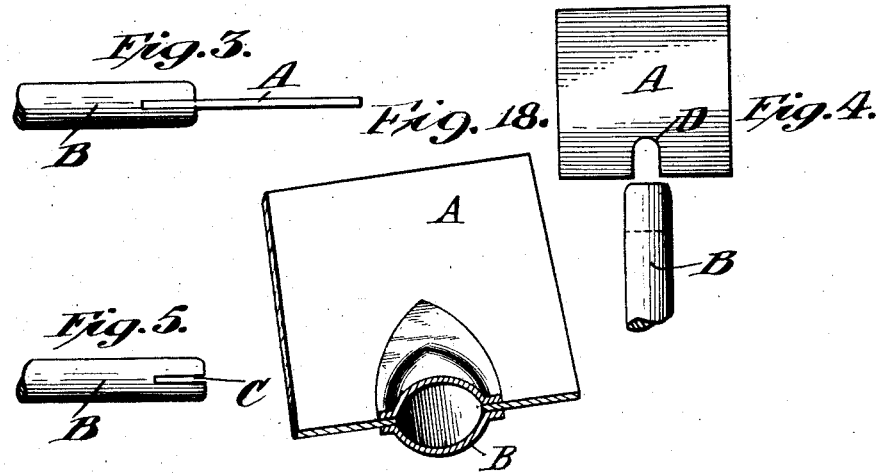
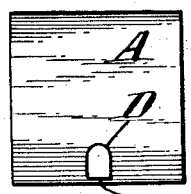
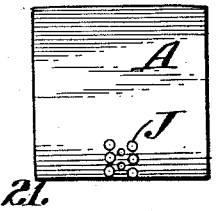
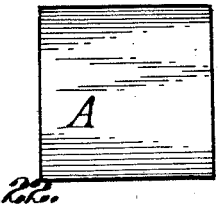
Attest:
Inventor:
Laurence S. Lachman
by Dickerson, Brown, Raegener + Binney, Attys.

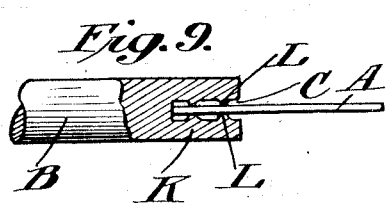
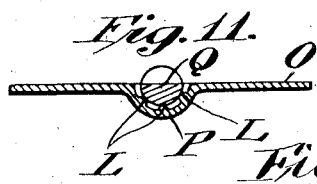
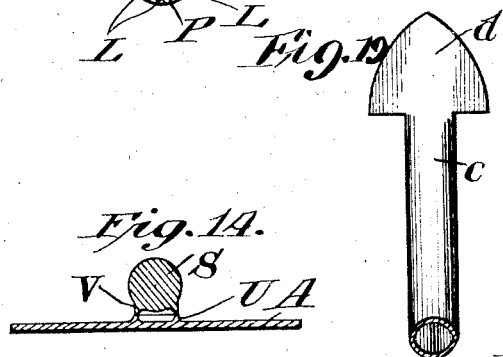
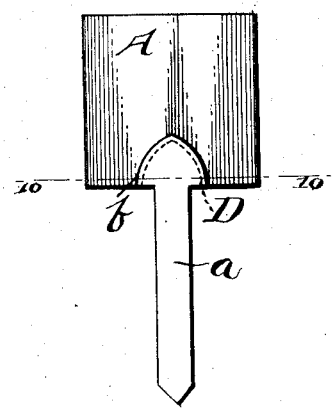
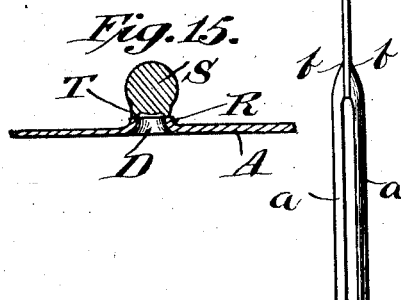
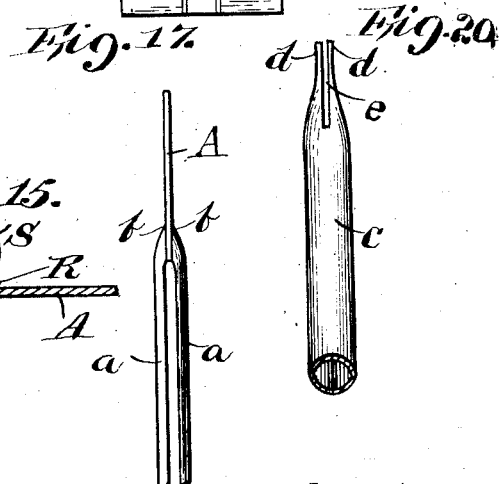

UNITED STATES PATENT OFFICE.

LAURENCE S. LACHMAN, OF NEW YORK, N. Y., ASSIGNOR TO UNIVERSAL ELECTRIC WELDING COMPANY, A CORPORATION OF NEW YORK.

METHOD OF ELECTRIC WELDING.

979,970.   Specification of Letters Patent.   Patented Dec. 27, 1910.

Application filed October 17, 1906. Serial No. 339,321.

*To all whom it may concern:*

Be it known that I, LAURENCE S. LACHMAN, a citizen of the United States, and resident of the borough of Manhattan, city, county, and State of New York, have invented certain new and useful Improvements in Methods of Electric Welding, of which the following is a specification, accompanied by drawings.

This invention relates to a method of electric welding, and more particularly to welding processes for welding rods, bars or handles to sheets of metal, as for instance, the blades of hoes, shovels, trowels, and any article in which a broad, substantially flat sheet of metal is to be welded to a narrow bar or handle. By means of this process of welding, handles may be welded on to boilers, or ears may be welded to all manner of cooking utensils.

The object of the invention is to enable articles of the character mentioned to be securely welded in a simple, cheap and efficient manner.

Further objects of the invention will hereinafter appear and to these ends the invention consists of a method of welding for carrying out the above objects, embodying the features and steps substantially as hereinafter fully described and claimed in this specification and illustrated in the accompanying drawings, in which,—

Figure 1 is a vertical sectional elevation of suitable apparatus for carrying out the process; Fig. 2 is a plan view of a bladed implement; Fig. 3 is a side view of the device shown in Fig. 2; Fig. 4 is a plan view of said implement with the blade and handle separated; Fig. 5 is a side view of the handle; Figs. 6, 7 and 8 are plan views of alternative forms of blades; Fig. 9 is a side view of such an implement in process of manufacture, a portion of the handle being shown in section; Fig. 10 is a side elevation of a similar implement in process of manufacture, the blade being shown in section; Figs. 11 and 12 illustrate alternative methods of joining a rod and blade or plate, said figures showing the parts assembled for welding; Fig. 11 showing a transverse section through the region where the weld is to be, and Fig. 12 showing a side elevation of the rod or handle and a longitudinal section of the plate or blade. Fig. 13 is a plan view of an alternative form of blade or plate having a rib or ridge formed on it to facilitate the welding of said blade or plate to a rod or handle, and Fig. 14 shows a transverse section through said blade or plate and rod or handle, assembled for welding; Fig. 15 is a sectional view similar to Fig. 14, but illustrates an alternative method of forming said rib or ridge; Figs. 16, 17 and 18 illustrate the welding of a strap or like part to a blade or sheet; Fig. 16 showing a top view of the parts welded together, Fig. 17, a side view thereof, and Fig. 18 a perspective view partly in section through Fig. 16 on the line 10—10; Figs. 19 and 20 show respectively, a top view and a side view of a tubular strap adapted to use in the manner illustrated in Figs. 16, 17 and 18; Figs. 21 and 22 illustrate the welding at or nearly at right angles of a blade and rod or tube; Fig. 21 showing a top view of the parts assembled for welding, the blades being sectioned, and Fig. 22 being a similar view illustrating an alternative construction of the parts as prepared for welding.

Referring to Figs. 1, 2, 3, 4 and 5, A represents a blade, and B a portion of the handle to be welded thereto. As shown, the handle is provided with a slot C in its end, into which the blade is adapted to be slipped; and since if the blade may contact with the entire surface area of the slot in the handle there would be too great contact area to permit the economical bringing of the parts to welding temperature by an electric current, and considerable bur would be formed around the welding, one of these parts is so formed as to reduce the area of conductive contact materially below the area of the blade included within such slot. In the construction shown this is accomplished by cutting out the blade to form a slot D, slightly narrower in width than the diameter of the handle B taken through the slot C, so that the sides of the handle project slightly over the edges of the slot D in the blade A. The parts to be welded are then placed in a suitable welding apparatus illustrated in Fig. 1, in which E and F are grooved electrodes adapted to receive the rounded portion of the handle B. These electrodes are suitably connected in circuit with a source of electric current G, a suitable switch H being provided in the circuit. The current is passed through the parts to be welded and the electrodes are simultaneously forced together in any suitable manner, whereby a weld is formed between the handle and the blade. As the parts are heated the portions of the handle which form the slot C are forced together and eventually meet and are welded together.

In Fig. 6 a modification of the blade is shown, in which a solid portion I is left connected across the end of the slot D.

In Fig. 7 the blade is shown provided with a number of perforations J instead of a slot D to reduce the cross sectional area at the point of weld.

In Fig. 9 the same object is accomplished by reducing the electric contact area of the surfaces of the slot so that a solid blade such as shown in Fig. 8, may be used. In this method of forming the union, each jaw K at each side of the slot C in the handle is provided with points or projections L suitably formed from the metal and the solid blade A is placed in the jaws. In the process of welding the points L are welded to the flat blade and the jaws are forced together.

In Fig. 10 the reverse of Fig. 9 is shown, in which the blade is provided with projections instead of the handle.

In Figs. 11 and 12 the blade O is formed with a depressed portion P, constituting a socket to receive the end of the handle Q; and this socket may be provided with projections L, and the end Q of the handle is placed in the socket P in contact with the projections L to form the weld.

Instead of reducing the electric contact area between blade and handle by cutting out, or forming teeth on, one of the parts, as shown in the preceding views, I may form a continuous ridge on one or the other of the parts. To this end I may form a ridge or rib U on blade A, by pressing such ridge or rib out of the solid metal as shown in Fig. 13, or by punching a hole or slot D in the blade and pressing up the edges of this hole or slot to form a rib or ridge R as shown in Fig. 15. The handle S is preferably provided with a corresponding ridge or rib T (Figs. 14 and 15) and in making the weld this rib or ridge T is placed edge to edge against the corresponding rib or ridge U or R of the blade and the current is passed through the handle and blade, and said contacting ribs or ridges or parts are at the same time pressed together.

In Figs. 16, 17 and 18 a strap is shown welded to the blade of a shovel although the same method may be used in welding the strap to blades or flat sheets for other purposes. The blade A has a portion cut away at D and the strap is in two semitubular parts $a$ having flat ends $b$ electrically welded to the edges of the metal around the recess D. The strap $c$ may be tubular as shown in Figs. 19 and 20, with one end split at $e$ and flattened to form the ears $d$ which are welded to the blade as in Fig. 16.

In Fig. 21 the blade is provided with an aperture $f$ and the solid or tubular handle $g$ is provided with an enlarged or upset head $h$, the shank of the handle being passed through the hole, and the head welded to the blade.

In Fig. 22 the head $h$ of the handle $g$ is placed over the aperture in the blade and welded to the edges around the aperture. If desired a washer or plate $i$ may be placed over the hole and the three parts welded together.

I claim and desire to obtain by Letters Patent the following:

1. The process of electrically welding objects together which consists in forming in one a socket adapted to receive a part of the other, and providing the engaging portion of one of said objects with means limiting the relative electric contact area of said objects, placing the objects together and passing a current of electricity through the parts and simultaneously forcing said parts together.

2. The process of electrically welding objects together which consists in forming in one a slot adapted to receive an edge of the other, and providing the engaging portion of one of said objects with means limiting the relative electric contact area of said objects, placing the objects together and passing a current of electricity through the parts and simultaneously forcing said parts together.

3. The process substantially as herein described of electrically welding a handle to a blade, which consists in forming the handle with a slot in its end, reducing the section of metal at one portion of the blade, placing said reduced portion of the blade in the slot in the handle, passing a current of electricity through the parts and simultaneously forcing said parts together.

4. The process substantially as herein described of electrically welding a handle to a blade, which consists in forming the handle with a slot in its end, cutting away a portion of the metal at one edge of the blade to reduce the section of metal, placing said reduced portion of the blade in the slot in the handle, passing a current of electricity through the parts and simultaneously forcing said parts together.

5. The process of electrically welding blades and shanks which consists in providing the blade with a reduced portion, and providing the shank with a lug adapted to overlap said reduced portion, placing the blade and shank together with the lug so overlapping, passing a welding current through the parts in this position and forcing the parts together.

In testimony whereof I have signed this specification in the presence of two subscribing witnesses.

LAURENCE S. LACHMAN.

Witnesses:
OLIN A. FOSTER,
A. K. SCHNEIDER.